United States Patent [19] [11] 4,259,357
Van Kranenburg [45] Mar. 31, 1981

[54] STABILIZED MILKPROTEINS-CONTAINING COMPOSITIONS

[75] Inventor: Simon Van Kranenburg, Capelle a/d der IJssel, Netherlands

[73] Assignee: Internationale Octrooi Maatschappij "Octropa" B.V., Rotterdam, Netherlands

[21] Appl. No.: 43,512

[22] Filed: May 29, 1979

[30] Foreign Application Priority Data

May 31, 1978 [GB] United Kingdom ............... 25165/78

[51] Int. Cl.$^3$ .............................................. A23K 1/18
[52] U.S. Cl. ........................................ 426/42; 426/56; 426/63; 426/623; 426/630; 426/634; 426/635; 426/807; 426/641
[58] Field of Search .................. 426/42, 156, 635, 63, 426/641, 623, 2, 630, 807, 634

[56] References Cited

U.S. PATENT DOCUMENTS 3,794,740   2/1974   Achorn et al. .................. 426/807 X
3,934,041   1/1976   Snyder ............................. 426/807 X
4,089,979   5/1978   Jackson ........................... 426/807 X

OTHER PUBLICATIONS

Morrison "Feeds & Feeding", Morrison Publishing Co., 1957, pp. 674-675.
Webb et al., "Fundamentals of Dairy Chemistry", Avi Publishing Co., 1965, pp. 518-524 & 530-534.
Grant "O Hackh's Chemical Dictionary" McGraw Hill Book Co., 1969, p. 428.

Primary Examiner—R. B. Penland
Attorney, Agent, or Firm—Barry Kramer

[57] ABSTRACT

A process for stabilizing an aqueous composition, which contains insoluble components mainly consisting of insoluble protein, insoluble carbohydrates and fats, which tend either to precipitate or to migrate to the surface of the composition, which process comprises incorporating into a dry composition a stabilizing proportion of a casein which has been enzymatically hydrolysed under conditions such that the K-casein moiety has been hydrolysed whereas no peptides having a molecular weight below $10^4$ have been formed.

34 Claims, No Drawings

STABILIZED MILKPROTEINS-CONTAINING COMPOSITIONS

The invention relates to a process for the preparation of homogeneous, liquid compositions. In particular the invention relates to a process for the preparation of edible, aqueous suspensions comprising particles which display a tendency to settle or to precipitate and which contain, for instance, isoluble, often denatured proteins, insoluble carbohydrates, and/or particles which display a tendency to migrate to the surface of the liquid, such as fats or other components, the specific weight of which is appreciably smaller than the specific weight of the liquid in which the particles are suspended or emulsified. The occurrence of these undesirable phenomena results in suspensions being obtained which have no homogeneous composition, which is visually—and in the case where edible compositions are involved nutritionally—unacceptable.

These frequently occurring problems will in particular arise in the preparation of liquid animal feed compositions, such as calf milk replacers, which have a relatively high content of insoluble carbohydrates and fats.

Attempts have been made to solve these problems by incorporating a stabilizer into the composition.

As stabilizers hydrocolloids have been proposed. However, these stabilizers are unattractive, chiefly by reason of cost price. Moreover, to achieve optimum activity of these stabilizers the water used as diluent for the composition should be brought to a temperature above 37° C., which is in some cases objectionable.

Applicants have now found a process which alleviates the above disadvantages.

The present invention provides a process for the preparation of homogeneous compositions starting from (a) a solvent, (b) a blend containing components which, when mixed with said solvent, tend to precipitate or to migrate to the surface of the solvent, and (c) a stabilizer which keeps said components in suspension, which process comprises using a stabilizer consisting of a casein which has been hydrolysed by a proteolytic enzyme under conditions such that the K-casein moiety is hydrolysed whereby no peptides having a molecular weight below $10^4$ are formed.

As stated above, the components which should be kept in suspension can comprise all kinds of materials whose specific weights differ to an appreciable extent from the specific weight of the diluent.

Where the stabilization of, for instance, calf milk replacers is involved, these components consist of denatured proteins and high molecular weight carbohydrates, having a specific weight ranging between 1 and about 1.5, and fats having a specific weight of below 1. As diluent for these calf milk replacers water is used.

The casein which is treated with the proteolytic enzyme can be an acid casein or a casein salt such as sodium caseinate.

The proteolytic enzymes preferably applied for this purpose are those which are capable of partially hydrolysing casein and particularly hydrolysing K-casein, whereby no substantial amount of peptides with a molecular weight of less than $10^4$ is formed. In other words, preferably those enzymes are used which mainly achieve curdling or clotting and thus mimic rennet.

In the literature these enzymes are in general specified by the term "rennet substitutes". These rennet substitutes are products commercially available under the trade names Noury Liquid, Noury Granules, Meito Rennet, Emporase (derived from the organism Mucor Pusillus Lindt), Marzyme, Fromase, Rennilase, Hannilase (derived from the organism Mucor Miehei). It was further found that proteolytic enzymes of microbiological origin, especially subtilisin, were particularly advantageous. In a preferred embodiment of the process according to the invention for the preparation of calf milk replacers, it is recommended to use subtilisin originating from Bacillus licheniformis- or subtilis strains. These subtilisins, marketed by the firm of NOVO under the tradename Alcalase (R), the principal component of which is subtilisin Carlsberg, and Neutrase (R), were found to give excellent results in stabilizing calf milk replacers based on soyameal concentrate, milk proteins and fats.

These enzymes are especially suitable because at a pH within the range of 5.0 to 7.5, prevailing in calf milk replacers, they ensure the in situ formation of the required, partially hydrolysed casein, as defined above, without it being necessary that the hydrolysis be carried out under strictly controlled time and temperature conditions.

In the process according to the invention it is possible either to incorporate into the composition an effective amount of enzymatically treated casein, or to incorporate into the starting mixture—which is to be diluted to a liquid composition—untreated casein together with the enzyme, after which the hydrolysis is allowed to take place in situ subsequent to dilution of the mixture with the solvent.

Preferably the enzyme is applied onto a carrier. The carrier may comprise a water-soluble or water-dispersible salt. Preferably the salt is a substance binding calcium and magnesium ions, such as an alkali metal polyphosphate, e.g. sodium pyrophosphate, sodium tripolyphosphate and/or sodium hexametaphosphate, or an alkali metal citrate or ethylenediamine tetraacetate (EDTA).

These substances promote keeping the proteins in suspension. Moreover, it is believed that the use of these substances has an emulsifying effect on fat globules.

Especially when the composition to be stabilized contains whey proteins, it is recommended to use these substances in an amount of 0.1–10% by weight calculated on the amount of protein, whereby these substances can be partly or wholly used as a carrier for the enzyme.

In a preferred embodiment of the process of the present invention the enzyme applied onto a carrier is coated with a water-soluble or water-dispersible polymer, e.g. a cellulose derivative or polyethylene glycol.

A particular application of the present invention is concerned with the preparation of calf milk replacers. According to the invention these calf milk replacers are obtained by (a) preparing a mixture, comprising proteins, fats, carbohydrates, at least 0.5% casein calculated on dry matter, and an effective amount of the proteolytic enzyme;

(b) diluting this mixture with enough water to obtain a suspension having a solids content of 5–20% by weight;

(c) if necessary, adjusting the pH to a value ranging from 5.0 to 7.5.

Preferably 1–10% by weight of sodium caseinate is incorporated into the mixture. Preferably 10–30% by weight of fat, 10–30% by weight of protein and 10–50% by weight of carbohydrates are incorporated into the mixture.

The enzyme preferably used is a subtilisin, which has as its principal enzyme component subtilisin Carlsberg. This enzyme is preferably used in an amount of from 0.01–3% by weight, calculated on the amount of casein when an enzyme is used having an activity of 0.5–0.6 Anson units/g, measured at 25° C. and at pH 7.5.

The protein source preferably comprises whey protein and/or soya proteins. It should be understood that other proteins, such as potato protein or single cell protein, can be used as well. It was found convenient to introduce as a further adjuvant to the mixture an amount of 0.1–10% by weight of the above-mentioned substances capable of binding calcium and magnesium ions.

The invention also relates to dry animal feed compositions comprising besides the usual ingredients such as fats, carbohydrates, proteins, vitamins and minerals, also casein and a proteolytic enzyme capable of hydrolysing only the K-casein moiety of the casein molecule.

The animal feed compositions according to the invention preferably contain 0.5–10% by weight of sodium caseinate, 10–30% by weight of fat, 10–30% by weight of proteins and 10–50% by weight of carbohydrates. The enzymes and adjuvants such as substances capable of binding calcium and magnesium ions to be introduced into these animal feed compositions, and of the manner of processing these compositions have been mentioned elsewhere in the specification and will therefore not be repeated.

It will be understood that animal feed compositions according to the present invention can be provided which besides the usual ingredients also comprises a casein, the K-casein moiety of which has already been hydrolysed by means of a proteolytic enzyme. For the majority of animal feed compositions an amount of 0.5–10% by weight of enzymatically treated sodium caseinate will suffice.

In the specification the application of the invention for the preparation of animal feed compositions has been illustrated. It will be understood, however, that the gist of the invention can also be applied for the preparation of other liquid compositions adapted for human purposes.

The invention will now be illustrated with reference to the following Examples.

EXAMPLE 1

A mixture was prepared comprising

|  | % by weight |
| --- | --- |
| fat | 20 |
| soya protein concentrate | 15 |
| whey powder | 55 |
| sodium caseinate | 9 |
| vitamins/minerals | .1 |

To this mixture was added an amount of 0.05% by weight of subtilisin from *Bacillus subtilis* (Neutrase ex Novo, activity 0.5 Anson units/g at 25° C. and pH 7.5). A suspension (pH 6.6) having a solids content of about 10% by weight was prepared by adding tap water to the mixture in a vessel and stirring it for 5 minutes. By the action of the enzyme the suspension gradually resembled buttermilk. After the suspension was allowed to stand for one hour, no precipitate was observed on the bottom of the vessel.

No fatty layer was observed at the surface of the liquid. The liquid was of a completely homogeneous composition. SDS-polyacrylamide gel electroforese showed that the enzyme that had been used had hydrolysed K-casein, whereas α- and β-caseins had not been affected even after four hours. The electroforese patterns showed that casein was broken down into proteins the molecular weight of which ranged between 10 and $20 \times 10^3$, whereas no peptides had been formed of a molecular weight ranging between 5 and $10 \times 10^3$.

When a composition was prepared starting from the same ingredients but without enzyme, almost immediately a precipitate was formed which mainly consisted of insoluble carbohydrates and proteins, and gradually creaming of fat could be observed.

EXAMPLE 2

Example 1 was repeated, except that the enzyme used this time was subtilisin from *Bacillus licheniformis* (Alcalase ex Novo, activity 0.6 Anson units/g at 25° C., pH 7.5). The results were as satisfactory as in Example 1.

EXAMPLE 3

Example 1 was repeated, except that the enzyme used this time was commercially available rennet. The results were as satisfactory as in Example 1.

EXAMPLE 4

Examples 1–3 were repeated, except that the amount of sodium caseinate was reduced to 5% by weight, while the amount of soya concentrate was proportionally increased. Also in this case a satisfactory stabilizing effect was achieved.

EXAMPLE 5

A mixture was prepared comprising:

|  | % by weight |
| --- | --- |
| fat | 22 |
| whey powder | 55 |
| sodium caseinate | 1 |
| soya protein concentrate | 21 |
| vitamins and minerals | 1 |

To this mixture were added 0.05% by weight of the enzyme used in Example 2 and 0.4% by weight of sodium tripolyphosphate. From this mixture an aqueous suspension was prepared having a pH of 6.6 and a solids content of 7% by weight. Also this suspension displayed an excellent stability.

EXAMPLE 6

Example 5 was repeated, except that 0.8% by weight of acetic acid was used instead of sodiumtripolyphosphate. The resulting aqueous suspension also displayed an excellent stability.

EXAMPLE 7

The formulation of Example 1 was repeated, except that the enzyme was added in the form of granules. The enzyme granules comprised 12.5% by weight of enzyme, 77.5% by weight of sodiumtripolyphosphate, 4% by weight of magnesiumoxide and 6% by weight of dextrin/$H_2O$.

Granulation was effected by spraying a solution of the enzyme and dextrin onto polyphosphate particles. Powdered magnesium oxide was used to prevent the formation of aggregates. Dosing of the necessary amount of enzyme granules was very readily effected by adding them to the dry starting mixture of the ingredients or to the fat.

EXAMPLE 8

To the mixtures of Example 1 and Example 5 were added 9% by weight and 1% by weight respectively of the product of the enzymatic reaction of rennet and sodium caseinate.

The mixtures so obtained were used for the preparation of aqueous suspensions having a solids content of 10% by weight. Also these suspensions displayed an excellent stability.

I claim:

1. A process for producing a dry composition, which on dilution with water yields a homogenous aqueous composition, said process for producing said dry composition comprising; admixing (a) from 10 to 30 wt. % fat, (b) from 10 to 30 wt. % protein, (c) from 10 to 50 wt. % carbohydrates said composition having at least part of the protein and the carbohydrates water-insoluble, (d) at least 0.5 wt. % of a casein stabilizer which has been treated with an effective amount of a proteolytic enzyme under conditions such that the K-casein moiety contained in said casein is hydrolysed without forming peptides having a molecular weight of below $10^4$ and (e) from 0.1 to 10 wt. %, based on the amount of protein, of a water-soluble or water-dispersible salt which binds calcium and magnesium ions.

2. A process according to claim 1, in which the casein is sodium caseinate.

3. A process according to claim 2, in which 1 to 10% by weight of sodium caseinate is used.

4. A process according to claim 1, in which the protein comprises a soya protein concentrate.

5. A process according to claim 1, in which the protein comprises whey proteins.

6. A process according to claim 5, in which rennet or rennet substitutes derived from Mucor Pusillus Lindt or Mucor Miehei are used.

7. A process according to claim 1, in which the proteolytic enzyme consists of subtilisin.

8. A process according to claim 7, in which a subtilisin is used which is derived from a *Bacillus licheniformis* strain.

9. A process according to claim 7, in which a subtilisin is used which is derived from a *Bacillus subtilis* strain.

10. A process according to claim 7, in which 0.01–3% by weight, calculated on the amount of casein, of a subtilisin is used, the principal enzyme component of which is subtilisin Carlsberg having an activity of 0.5–0.6 Anson units/g at 25° C. and at pH 7.5.

11. A process according to claim 1, in which the substance binding calcium and magnesium ions consists of an alkali metal polyphosphate selected from the group consisting of sodium pyrophosphate, sodium tripolyphosphate and sodium hexametaphosphate.

12. A process according to claim 1, in which the substance binding calcium and magnesium ions consists of an alkali metal citrate.

13. A process according to claim 1, in which the proteolytic enzyme is applied onto a carrier consisting of a substance binding calcium- and magnesium ions.

14. A process according to claim 13, in which the carrier consists of sodium tripolyphosphate.

15. A process according to claim 13, in which the enzyme applied to the carrier is coated with a water-soluble or water-dispersible polymer.

16. A process according to claim 15, wherein the polymer is a cellulose derivative.

17. A process according to claim 15, wherein the polymer is polyethylene glycol.

18. A process according to claim 1, wherein the pH of the aqueous composition is adjusted to a value ranging from 5.0 to 7.5.

19. A process according to claim 1, in which the aqueous composition is diluted with a sufficient proportion of water to obtain a composition having a solids content ranging from 5–20% by weight.

20. A dry composition, which upon dilution with water yields a homogeneous aqueous animal feed composition, said dry composition comprising (a) from 10 to 30 wt. % fat, (b) from 10 to 30 wt. % protein, (c) from 10 to 50 wt. % carbohydrates said composition having at least part of the protein and the carbohydrates water-insoluble, (d) at least 0.5 wt. % of a casein stabilizer which has been treated with an effective amount of a proteolytic enzyme under conditions such that the K-casein moiety contained in said casein is hydrolysed without forming peptides having a molecular weight below $10^4$, or at least 0.5 wt. % of untreated casein containing K-casein and an effective amount of a proteolytic enzyme selected from the group consisting of rennet and rennet substitutes, and (e) from 0.1 to 10 wt. %, based on the amount of protein, of a water-soluble or water-dispersible salt which binds calcium and magnesium ions.

21. Animal feed composition according to claim 20, in which the casein component is 0.5–10% by weight of sodium caseinate.

22. Animal feed composition according to claim 20, in which the protein comprises a soya protein concentrate.

23. Animal feed composition according to claim 20, in which the protein comprises whey proteins.

24. Animal feed composition according to claim 20, in which the proteolytic enzyme comprises subtilisin.

25. Animal feed composition according to claim 24, in which the subtilisin is derived from a *Bacillus licheniformis* strain.

26. Animal feed composition according to claim 24, in which the subtilisin is derived from a *Bacillus subtilis* strain.

27. Animal feed composition according to claim 20, in which the proteolytic enzyme comprises rennet or rennet substitutes, derived from Mucor Pusillus Lindt or Mucor Miehei.

28. Animal feed composition according to claim 20, in which the substance binding calcium and magnesium ions consists of an alkali metal polyphosphate.

29. Animal feed compositions according to claim 28, in which the polyphosphate consists of sodium pyrophosphate, sodium tripolyphosphate and/or sodium hexametaphosphate.

30. Animal feed composition according to claim 20, in which the substance binding calcium and magnesium ions consists of sodium citrate.

31. Animal feed composition according to claims 20, in which the proteolytic enzyme is applied onto a carrier consisting of a substance binding calcium and magnesium ions.

32. Animal feed composition according to claim 31, in which the enzyme is applied onto a carrier coated with a water-soluble or water-dispersible polymer.

33. Animal feed composition according to claim 32, in which the polymer is a cellulose derivative.

34. Animal feed composition according to claim 32, in which the polymer is polyethylene glycol.

* * * * *